United States Patent Office 3,397,160
Patented Aug. 13, 1968

3,397,160
POLYURETHANE MODIFIED EPOXY ESTERS
Darrell D. Hicks, Louisville, Ky., assignor to Celanese Coatings Company, New York, N.Y., a corporation of Delaware
No Drawing. Filed Feb. 17, 1966, Ser. No. 528,088
6 Claims. (Cl. 260—18)

ABSTRACT OF THE DISCLOSURE

Polyurethane modified epoxy esters suitable for use in coatings are produced by the reaction of (A) a monohydroxy triester of a fat acid and a glycidyl ether of a dihydric phenol, (B) a di-hydroxy diester of a fat acid and a glycidyl ether of a dihydric phenol, and (C) an organic diisocyanate.

---

This invention relates to modified epoxy ester compositions. More particularly, this invention pertains to epoxy esters which contain polyurethane modifications, the modifications resulting from reaction of hydroxyl groups in the epoxy esters with polyisocyanates.

Polyurethane modified drying oils are well known compositions which are used quite widely in the coatings industry. Polyurethane modified drying oils are prepared by first alcoholizing an ethylenically unsaturated vegetable oil of the drying or semi-drying type with a polyhydric alcohol to produce hydroxy containing esters. The resulting esters are then coupled through urethane linkages by reaction of polyisocyanates with the hydroxy groups in the esters.

Polyurethane modified drying oils are fast drying and hard-wearing. Their wear-resistance is much better than unmodified drying oils or conventional alkyd resins.

Epoxy esters are also well known compositions in the coatings field. Epoxy esters are prepared by esterifying polyepoxide resins with ethylenically unsaturated vegetable oil acids. Coatings prepared from epoxy esters have chemical resistance properties superior to coatings prepared from alkyds, especially in alkali resistance.

The compositions of this invention are polyurethane modified epoxy esters. By this invention, the excellent properties of epoxy esters are combined with the excellent properties of polyurethane modified drying oils, resulting in coatings having fast dry time, excellent wear-resistance, improved water and chemical resistance and especially good alkali and acid resistance.

The polyurethane modified epoxy esters of this invention are prepared by reacting: (A) an ethylenically unsaturated fatty acid ester of a poly(1,2 epoxy) compound, wherein said ester is free of unreacted epoxy groups and contains an average of about one alcoholic hydroxyl group per molecule; (B) an ethylenically unsaturated fatty acid ester of a poly(1,2 epoxy) compound, wherein said ester is free of unreacted epoxy groups and contains an average of about two alcoholic hydroxyl groups per molecule, and (C) a diisocyanate compound containing two isocyanate groups and no other groups reactive with hydroxyl groups. The monohydroxy ester (A), the dihydroxy ester (B), and the diisocyanate (C) are reacted in a ratio of 2 mols of (A) to $n$ mols of (B) to $n+1$ mols of (C), wherein $n$ is a number from 1 to 15. The resulting polyurethane modified epoxy ester contains no unreacted isocyanate groups.

The epoxy esters used in this invention contain an average of one and two hydroxyl groups per molecule and are prepared by reacting an unsaturated fatty acid with a polyepoxide. The epoxy esters contain no unreacted epoxide groups. When a carboxylic acid is reacted with an epoxide group an ester and a hydroxyl group are formed. Thus, when two mols of an acid are reacted with one mol of a diepoxide, a dihydroxy-diester results. When a greater amount of acid is used, such as three mols of carboxylic acid with one mol of diepoxide, a dihydroxy-diester is first formed. The unreacted acid can then be condensed with one of the formed hydroxyl groups to form a monohydroxy-triester with elimination of water. When polyepoxides containing more than two epoxide groups are utilized, monohydric and dihydric polyesters can be prepared by using the proper ratio of acid to epoxide groups. If the polyepoxides contain hydroxyl groups as well as epoxide groups, these hydroxyl groups must be included when determining the proper ratio of acid and polyepoxide reactants.

The compositions of this invention are prepared by reacting the hydroxyl containing epoxy esters with diisocyanates. The hydroxyl groups of the esters combine with the isocyanates forming polyurethanes. The dihydroxy esters and the diisocyanates join together to form polymer chains and the monohydroxy esters act as chain terminators. For instance, one mol of a dihydroxy ester will react with two mols of a diisocyanate to form an intermediate compound containing two unreacted isocyanate groups. Two mols of a monohydroxy ester will then react with the isocyanate groups to form a polyurethane polymer. If five mols of a dihydroxy ester are reacted with six mols of diisocyanate, a polymer containing two unreacted isocyanate groups again results. Two mols of monohydroxy ester will then react with the isocyanate groups to terminate the polymer chains. By reacting $n$ mols of dihydroxy ester with $n+1$ mols of diisocyanate and two mols of monohydroxy ester, polymeric compositions are produced. A wide variety of different molecular weight polymers can be produced by varying $n$. However, in order to obtain compositions having good solubility characteristics and desirable solution viscosities, it is preferred that the molecular weight be controlled by limiting $n$ to a value of about 15.

Polyepoxides useful in this invention contain more than one 1,2 epoxy group per molecule. The most preferred polyepoxides are diglycidyl ethers of dihydric phenols which are prepared by reacting a dihydric phenol with a molar excess of epichlorohydrin using caustic alkali as the condensation and dehydrohalogenation agent. Such polyepoxides are substantially monomeric and have molecular weights ranging from about 222 to about 500. Dihydric phenols from which the diglycidyl ethers are derived includes p,p-dihydroxydiphenyl propane (Bisphenol A), resorcinol, hydroquinone, p,p'-dihydroxydiphenyl, dihydroxydiphenyl methane, dihydroxybenzophenone, dihydroxydiphenyl sulfone and aromatic ring brominated and chlorinated derivatives of these phenols.

Polymeric polyepoxides can also be used in this invention. Such polyepoxides are made by reacting less than two mols of epichlorohydrin with one mol of dihydric phenol using caustic alkali substantially equivalent to the epichlorohydrin. These polyepoxides, in addition to glycidyl ether groups, contain hydroxyl groups. For instance, the reaction product of three mols of epichlorohydrin and two mols of dihydric phenol contain, in theory, two glycidyl ether groups and one hydroxyl group. To prepare a dihydroxypolyester from this polyepoxide, three mols of carboxylic acid must be reacted with one mole of the polyepoxide and for a monohydroxy polyester, four mols of carboxylic acid are needed. Useful polymeric polyepoxides for this invention are made with 1.2 up to about 2 mols of epichlorohydrin per mol of dihydric phenol. The preferred polyepoxides have molecular weights ranging up to about 1000.

Additional polyepoxides useful in this invention are those obtained by epoxidation of unsaturated hydrocarbons. Such compounds include vinyl cyclohexene dioxide, 3,4-epoxycyclohexylmethyl - 3,4 - epoxycyclohexanecarboxylate, bis(3,4-epoxycyclohexylmethyl) sebacate, 1,5-pentanediol-bis (3,4-epoxycyclohexanecarboxylate), dicyclopentadiene diepoxide and the like. These compounds are epoxidized hydrocarbons, hydrocarbon ethers or hydrocarbon esters, wherein the hydrocarbons are aliphatic or alicyclic and contain at least two ethylenically unsaturated groups before expoxidation.

The unsaturated fatty acids which are reacted with the polyepoxides are monocarboxylic acids containing from about 12 to about 24 carbon atoms. Such acids are derived from naturally occurring fats and oils or they can be of synthetic derivation. Examples of suitable acids are those derived from linseed oil, oiticica oil, dehydrated castor oil, safflower oil, soybean oil, tall oil, etc. Such acids include linoleic, linolenic, eleostearic, oleic, licanic, erucic, palmitoleic, myristoleic, arachidonic and the like.

The diisocyanates used in the invention contain two NCO groups and no other groups reactive with hydroxyl groups. Examples of diisocyanates are tolylene diisocyanate, diphenylmethane diisocyanate, hexamethylene diisocyanate, 1,5-naphthalene diisocyanate and xylylene diisocyanate.

In preparing the epoxy esters, the polyepoxide and the fatty acid are heated at a temperature of about 100° C. to about 200° C. to effect the carboxyl-epoxy reaction. Further heating at temperatures upon about 275° C. are effective for carboxyl-hydroxyl condensation. In the latter reaction, water is a by-product and is removed as formed. Solvents, such as aromatic hydrocarbon (toluene, xylene and the like) or ketones (methyl ethyl ketone and methyl isobutyl ketone) are generally employed to facilitate the handling of the reactants and products. Catalysts are not necessary but can be used to shorten the reaction times. The preferred catalysts are basic types and include catalytic amount of sodium, potassium or calcium hydroxide, lithium, sodium or potassium carbonate, tertiary amines and quaternary ammonium compounds. The completeness of reaction is determined by the acid value, that is when the acid value of the reaction mixture drops to below about 10, the esterification reaction is adjudged to be complete.

The reaction of the epoxy esters with the diisocyante can be carried out at room temperature up to about 150° C. However, it is preferred to add the diisocyanate slowly to the epoxy ester while keeping the temperature between about 75° C. and 125° C. Reaction is continued until no isocyanate groups remain. The presence or absence of isocyanate groups is determined by the following test:

On drop of the reactants is dissolved in about 5 cc. of acetone in a test tube. One drop of a saturated aqueous solution of sodium nitrite is added to the solution. The development of a light orange or amber color within 10–50 seconds indicates the presence of unreacted isocyanate groups. No color development indicates that the isocyanate groups are all reacted.

The urethane modified epoxy esters can be used in varnishes, enamels and various protective coating applications. They are normally utilized as solutions in conventional paint solvents and can be applied by any conventional coating techniques, such as brushing, spraying, dipping and the like. The coatings will cure at ambient temperatures or they can be cured by heating at elevated temperatures up to about 175° C. to 200° C. Driers, such as lead, cobalt, manganese and rare earth salts (naphthanates for instance) can be used to obtain faster cures, especially in air-drying formulations.

The following examples are given to further explain this invention. Parts where expressed, are meant to be parts by weight.

Example A

DIHYDROXY-DIESTER OF POLYEPOXIDE PREPARATION

To a suitable reaction flask equipped with a stirrer, thermometer and condenser are added 840 parts of linseed oil fatty acids, 570 parts of the diglycidyl ether of Bisphenol A having an epoxide equivalent weight of 190, and 3.0 parts of powdered lithium carbonate. Heat and stirring are applied raising the temperature to 150° C. The temperature is held at 150° C. for six hours, until the acid value is 1.2.

Example B

MONOHYDROXY-TRIESTER OF POLYEPOXIDE PREPARATION

Into a suitable reaction flask equipped with a Dean-Stark azeotropic distillation apparatus, a stirrer and a thermometer are added 850 parts of linseed oil fatty acids, 380 parts of the digylcidyl ether of Bisphenol A having an epoxide equivalent weight of 190, 90 parts of xylene and 0.5 part of lithium carbonate. The reactants are heated with stirring for two hours at 140° C., at which time the acid value is 35 (initial acid value–141). The temperature is then raised to 250° C. and is held at this temperature for 2.5 hours at which time the acid value is 1.1.

Example 1

To a suitable reaction flask equipped with a stirrer, thermometer and condenser are added 47 parts of the dihydroxy-diester of Example A, 126 parts of the monohydroxy triester of Example B and 183 parts of xylene. Heat is applied raising the temperature to 100° C. Tolylene diisocyanate (17.4 parts) is slowly added to the resulting solution. Heating at 100° C. is continuted until a negative isocyanate test is obtained. The reactants are present in the ratios of 1 mol of the dihydroxy ester, 2 mols of the monohydroxy ester and 2 mols of diisocyanate. The resulting resinous solution, when reduced to 50% solids with xylene, has a Gardner-Holdt viscosity at 25° C. of A and a weight per gallon of 7.88 pounds at 25° C.

To the urethane modified epoxy ester solution (50% solids in xylene) are added 0.4% lead and 0.04% cobalt as the naphthenate salts (percentages based on the weight of metal to resin solids). Films are prepared on electrolytic tin plate using a 3 mil doctor blade. After drying for about three days at room temperature, the films are well cured and exhibit good adhesion to the substrate. The films pass a 28 inch-pound impact test and exhibit only slight blushing when soaked in a 1% sodium hydroxide solution in water for 24 hours, and very slight blistering when soaked in distilled water for 72 hours.

Example 2

Using the same procedure as described in Example 1, 56.4 parts of the dihydroxy diester of Example A and 75.7 parts of the monohydroxy-triester of Example B in 144 parts of xylene are reacted with 15.7 parts of tolylene diisocyanate. The resulting urethane modified epoxy ester, when dissolved to 50% solids with xylene has a Gardner-Holdt viscosity at 25° C. of G and a weight per gallon of 7.95 pounds at 25° C. In this exampe, the dihydroxy ester, the monohydroxy ester and the diisocyanate are reacted in the mol ratio of 2 to 2 to 3.

To the urethane modified epoxy ester solution (50% solids in xylene) are added 0.4% lead and 0.04% cobalt as the naphthenate salts. Films are prepared on electrolytic tin plate with a 3 mil doctor blade. After drying for about three days at room temperature, the films are well cured. The films pass a 28 inch-pound impact test and exhibit only slight blushing when soaked in 1% sodium hydroxide solution in water for 24 hours, and in distilled water for 72 hours.

Example 3

Using the same procedure as described in Example 1, 84.7 parts of the dihydroxy-diester of Example A and 75.7 parts of the monohydroxy-triester of Example B in 180 parts of xylene are reacted with 20.9 parts of tolylene diisocyanate (the molar ratio of reactants being 3 to 2 to 4 respectively). The resulting urethane modified epoxy ester at 50% solids in xylene has a Gardner-Holdt viscosity at 25° C. of I and a weight per gallon at 25° C. of 7.92 pounds. Films, prepared as described in Example 1, are well cured after remaining at room temperature for 72 hours. The films exhibit good adhesion, flexibility and mar resistance and excellent alkali resistance.

Example 4

Using the same procedure as is described in Example 1, 94 parts of the dihydroxy-diester of Example A and 63 parts of the monohydroxy-triester of Example B in 177 parts of xylene are reacted with 20.7 parts of tolylene diisocyanate (the molar ratio of reactants being 4 to 2 to 5 respectively). The resin, when dissolved at 50% solids in xylene, has a Gardner-Holdt viscosity at 25° C. of O and a density of 7.93 pounds per gallon, at 25° C. Films, prepared as described in Example 1, are well cured after drying for three days at room temperature. When soaked for 24 hours in 1% sodium hydroxide solution, the films are not damaged and show only slight blushing.

Example 5

Using the same procedure as described in Example 1, 112.8 parts of the dihydroxy-diester of Example A, 50.4 parts of the monohydroxy-triester of Example B and 24.4 parts of tolylene diisocyanate (molar ratio of 6 to 2 to 7 respectively) are reacted in 187.6 parts of xylene. The resulting urethane modified epoxy ester when dissolved at 50% solids in xylene has a Gardner-Holdt viscosity at 25° C. of T and a density at 25° C. of 7.88 pounds per gallon. Films prepared and cured as described in Example 1 exhibit excellent alkali and water resistance, and good flexibility, adhesion and mar resistance properties.

Example 6

Using the same procedure as described in Example 1, 150.3 parts of the dihydroxy-diester of Example A, 50.4 parts of the monohydroxy-triester of Example B, and 31.4 parts of tolylene diisocyanate (molar ratio of 8 to 2 to 9 respectively) are reacted in 232 parts of xylene. The resulting resin at 50% solids in xylene has a Gardner-Holdt viscosity at 25° C. of Z and a density at 25° C. of 7.98 pounds per gallon. Films prepared and cured as described in Example 1 exhibit good alkali, water and mar resistance.

Example 7

Using the same procedure as described in Example 1, 155.1 parts of dihydroxy-diester of Example A, 37.8 parts of monohydroxy-triester of Example B and 31.32 parts of tolylene diisocyanate (molar ratio of 11 to 2 to 12 respectively) are reacted in 336 parts of xylene. The resulting solution (40% solids) has a Gardner-Holdt viscosity at 25° C. of H. Films, prepared and cured as described in Example 1, exhibit good alkali, water and mar resistance.

It is to be understood that the foregoing detailed description is given merely by way of illustration and that many variations may be made therein without departing from the spirit of the invention.

The embodiments of the invention in which an exclusive property or privilege is claimed are defined as follows:

1. A curable composition comprising the reaction product of
   (A) an unsaturated fatty acid ester of a poly(1,2 epoxy) compound, wherein said ester is free of unreacted epoxy groups and contains an average of about one alcoholic hydroxyl group per molecule,
   (B) an unsaturated fatty acid ester of a poly(1,2 epoxy) compound, wherein said ester is free of unreacted epoxy groups and contains an average of about two alcoholic hydroxyl groups per molecule, and
   (C) a diisocyanate compound containing two isocyanate groups and no other groups reactive with hydroxyl groups, wherein
   (A), (B), and (C) are reacted in the ratio of two mols of (A) to $n$ mols of (B), to $n+1$ mols of (C) wherein $n$ is a number from 1 to 15, and wherein said reaction product is substantially free of unreacted isocyanate groups.

2. The composition of claim 1 wherein (A) is a tri (unsaturated fatty acid) ester of a di(1,2 epoxy) compound and (B) is a di (unsaturated fatty acid) ester of a di(1,2 epoxy) compound.

3. The composition of claim 1 wherein the poly(1,2 epoxy) compound is the diglycidyl ether of p,p'-dihydroxydiphenyl propane.

4. The composition of claim 1 wherein the unsaturated fatty acid is linseed fatty acid.

5. The composition of claim 1 wherein the unsaturated fatty acid is tall oil fatty acid.

6. The composition of claim 1 wherein the diisocyanate compound is tolylene diisocyanate.

References Cited

UNITED STATES PATENTS 3,177,167   4/1965   Skreckoski et al. _____ 260—18
2,970,062   1/1961   Hauge et al. _____ 106—252 X DONALD E. CZAJA, *Primary Examiner.*

C. W. IVY, *Assistant Examiner.*